2,795,385
Patented June 11, 1957

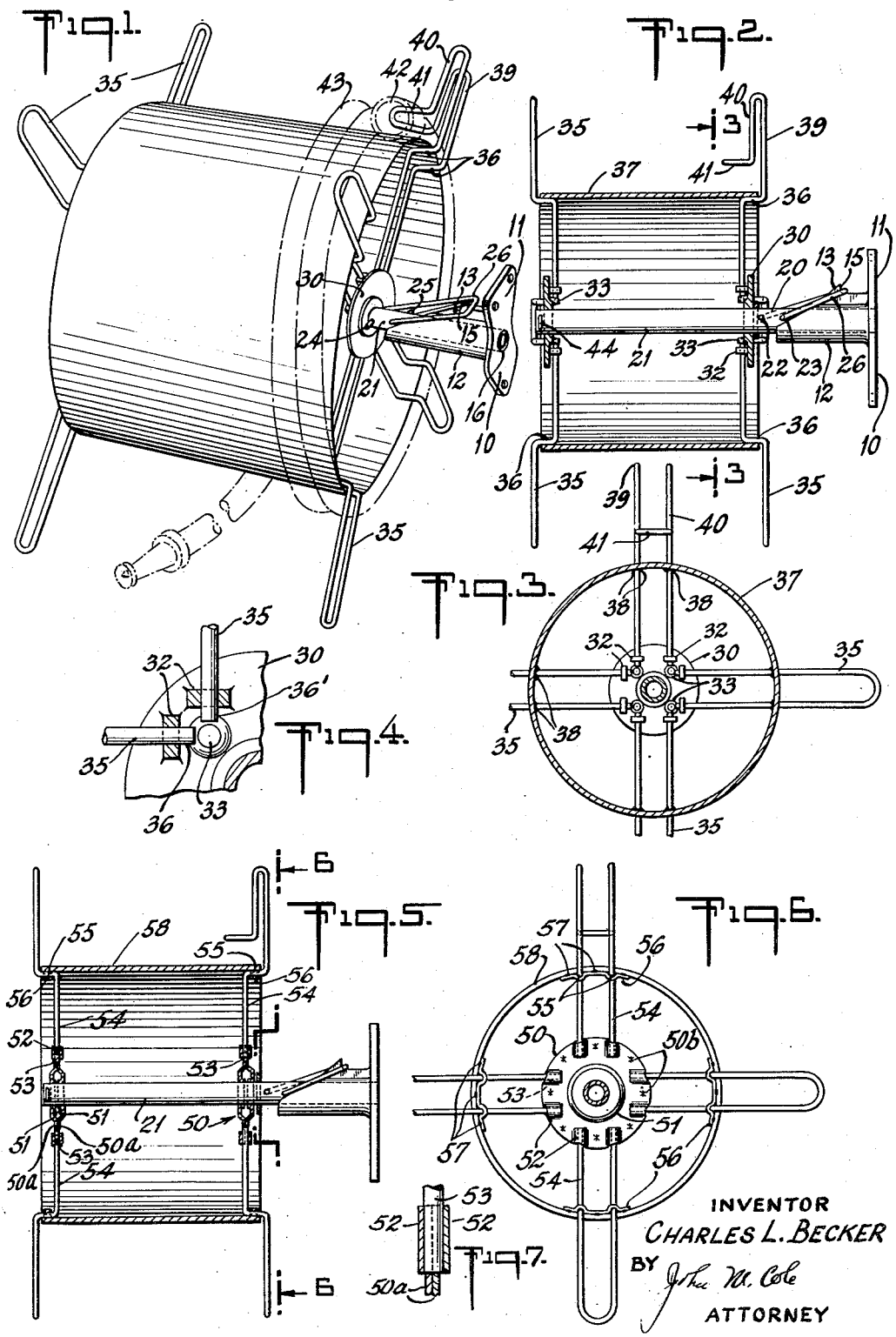

2,795,385
HOSE REEL

Charles L. Becker, Jamaica, N. Y.

Application April 14, 1954, Serial No. 423,041

10 Claims. (Cl. 242—86)

The present invention relates to hose reels and is more particularly directed toward hose reels adapted for storing garden hose in a convenient manner.

This application is a continuation in part of my abandoned application Serial No. 217,660, filed March 26, 1951.

The present invention contemplates a reel for this purpose having a drum carried on spokes connected to central hub members and these central hub members are revolvably carried on a normally horizontal shaft.

According to the present invention, the parts are composed of simple inexpensive units which can be easily made and readily and inexpensively assembled into a complete hose reel. According to the present invention, the hose reel may be carried on a bracket mounted on a suitable fixed support such as a post, or the side of the house, or it may be secured directly to the piping used to supply water to the hose. The reel is normally latched to the fixed support but is readily detachable from it to permit carrying the rolled up hose or for storage.

Other and further objects will appear as the description proceeds.

The accompanying drawings show, for purposes of illustrating the present invention, two embodiments in which the invention may take form, together with modifications of certain parts, it being understood that the drawings are illustrative of the invention rather than limiting the same.

In the accompanying drawings:

Figure 1 is a perspective view of the hose reel showing one form of mounting bracket;

Figure 2 is a transverse sectional view through the hose reel showing the bracket in elevation;

Figure 3 is a section on the line 3—3 of Figure 2 looking in the direction of the arrows;

Figure 4 is a fragmentary enlargement taken in the same direction as Figure 3 to show details of construction;

Figures 5 and 6 are views similar to Figures 2 and 3 illustrating another form of construction; and Figure 7 is a fragmentary sectional views showing a detail of Figures 5 and 6.

As shown in Figures 1 and 2, a mounting bracket 10 may be in the form of a casting having a flange 11 adapted for securement to the side of the house, a post or the like, and a horizontally extending tubular portion 12. This tubular portion has a long sloping cam-like surface 13 which extends from below the axis of the tubular portion 12 up to the shoulder 15. In the drawing, the hole 16 in the tubular element 12 extends all the way through the bracket. It may stop short if desired.

The socket 12 is adapted to receive the protruding end 20 of a shaft 21. This shaft is usually in the form of a piece of piping or electric conduit. The shaft has two holes 22 and 23 which receive the ends 24 and 25 of a spring loop member 26. This spring member is biased in a clockwise direction as viewed in the drawings and tends to bear against the tube 21. When the tube is pushed into the socket, formed in the bracket 10, the outer end of the loop member 26 engages the cam surface 13 and rides up over the top of the cam and drops behind the shoulder 15 so as to hold the shaft in place in the socket of the mounting member.

As shown in Figures 1-4, the shaft 21 carries two hub members 30 and 31. These hub members are alike and are in the form of simple disc-like castings, each having eight apertured lugs 32 arranged in pairs. The lugs are adjacent bosses or stops 33.

The spokes 35 are in the form of bent wire members having ends 36' which pass through the apertured lugs 32 as shown more clearly in Figure 4. The ends of these spokes normally rest against the stop members 33. The U-shaped spokes have offsets as indicated at 36. These offsets fit inside the drum 37 and the drum is welded to each of these offsets as indicated at 38. One of the spoke members, namely, spoke member 39 is made of a longer loop of wire than used in the other spoke members and such loop is bent back on itself as noted at 40 and at right angles as indicated at 41 so as to be spaced from the drum. It is adapted to engage the coupling 42 of a hose 43.

The manufacture of the reel of Figures 1-4 involves simple manufacturing steps. The preformed spokes are inserted in place in the hub members and then brought to position with the offsets inside the drum. Welding the offset portions of the spokes to the drum completes the assembly of the reel itself. The inner ends of the spokes are thereby locked in place. The reel can be readily placed on the shaft 21 and held in place by cotter pin indicated at 44 and by the end 24 of the spring 26.

When the reel is in position with the shaft in the socket of the mounting bracket, the shaft is held against turning by engagement of the end 25 of the spring with the cam 13. The coupling end of the hose can be slipped under the flanged end 41 of the spoke 39 and the other spokes be used as handles for conveniently turning the drum or spool so as to wind the hose on to it. Should one desire to remove the wound up hose to carry it to some other location, the spring 26 may be readily lifted up so as to unlatch the reel and shaft from the mounting bracket so that they can be removed.

In the form shown in Figures 5, 6 and 7, the hubs 50, 50 are each formed of two like sheet metal stampings 50a spot welded as indicated at 50b. These stampings are offset and inwardly flanged as indicated at 51 to provide an extended bearing surface for engagement with the shaft and have radial recesses 52 placed opposite one another and adapted to receive the inner ends 53 of the bent wire members or spokes 54, similar to but shorter than, the spokes 35. The offset portions 55 of the spokes 54 are received in straps 56 welded as indicated at 57 to the inside of the drum 56. This form of construction is less expensive than that shown in Figures 1-4 and equally satisfactory.

Since it is obvious that the invention may be embodied in other forms and constructions within the scope of the claims, I wish it to be understood that the particular forms shown are but two of these forms, and various modifications and changes being possible, I do not otherwise limit myself in any way with respect thereto.

What is claimed is:

1. In a hose reel, a plurality of spoke members each in the form of a length of wire bent to U-shape and having an offset at right angles to the direction of the U and intermediate the outer and inner ends of the spoke members, centrally apertured hub members spaced along an axis of rotation and having coplanar receivers of limited depth into which the inner ends of the spoke members enter, and a drum substantially in contact with and fixedly secured to the offset portions of the spokes to hold them in place.

2. A hose reel such as claimed in claim 1, wherein the hub members are in the form of sheet metal disks welded together and the receivers are formed by opposed recesses in each disk.

3. A hose reel such as claimed in claim 1, wherein the hub members are in the form of castings and have apertured lugs to receive the inner ends of the spokes, and stops opposite the lugs.

4. A hose reel such as claimed in claim 1, having straps extending across the offset portions of the spokes and welded to the drum.

5. A hose reel such as claimed in claim 1, wherein the offset portions of the spokes are directly welded to the drum.

6. In a hose reel as claimed in claim 1, wherein one of the spoke members is doubled back on itself and spaced from the outside of the drum to engage a hose coupling.

7. A hose reel comprising two disk-shaped hub members spaced apart and having coaxial apertures, each hub member being formed of two sheet metal plates each plate having on opposite sides of radial lines parallel semicylindrical bumps which together form parallel sockets, U-shaped spokes having their ends in the sockets, the spokes extending radially and having offsets uniformly spaced from the apertures, the spokes beyond the offsets being more widely spaced than the hub members, a drum about the offsets and secured to them to hold the spokes in place.

8. In a hose reel, spaced hub members having pairs of apertured lugs, spoke members each in the form of a U-shaped length of wire having its ends in the apertured lugs and an offset between the said ends and the doubled portion and at right angles to the direction of the U, and a drum substantially in contact with and welded to the spoke members at the offsets and holding the ends of the spokes in the apertured lugs, the doubled portion of the spokes extending outside the drum to form a spool.

9. In a hose reel, two disk-shaped hub members spaced apart and having coaxial apertures, pairs of lugs on one face of each hub member, U-shaped spokes having their ends in the lugs, the spokes extending radially and having offsets uniformly spaced from the apertures, the spokes beyond the offsets being more widely spaced than the hub members, a drum substantially in contact with and disposed about the offsets and secured to them to hold the spokes in place.

10. In a hose reel, a plurality of spoke members each in the form of a length of wire bent to U-shape and having an offset at right angles to the direction of the U and intermediate the outer and inner ends of the spoke members, centrally apertured hub members spaced along an axis of rotation and having coplanar receivers for the central portions of the spoke members, and a drum substantially in contact with and secured to the offset portions of the spokes.

References Cited in the file of this patent

UNITED STATES PATENTS

| | | |
|---|---|---|
| 810,977 | Poure | Jan. 30, 1906 |
| 873,143 | Wirt | Dec. 10, 1907 |
| 1,105,028 | Gill | July 28, 1914 |
| 1,250,766 | Barker | Dec. 18, 1917 |
| 1,509,656 | Lachman et al. | Sept. 23, 1924 |
| 1,674,185 | Tischler | June 19, 1928 |
| 1,868,634 | Gregory | July 26, 1932 |
| 2,097,778 | Schaub | Nov. 2, 1937 |